United States Patent
Seo

(10) Patent No.: US 11,361,558 B2
(45) Date of Patent: Jun. 14, 2022

(54) APPARATUS AND METHOD FOR ESTIMATING ROAD GEOMETRY

(71) Applicant: SAMSUNG ELECTRONICS CO., LTD., Suwon-si (KR)

(72) Inventor: Youngwan Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/007,650

(22) Filed: Aug. 31, 2020

(65) Prior Publication Data

US 2021/0241003 A1    Aug. 5, 2021

(30) Foreign Application Priority Data

Feb. 4, 2020 (KR) ................. 10-2020-0013304

(51) Int. Cl.
| | |
|---|---|
| *G06V 20/56* | (2022.01) |
| *G06T 7/60* | (2017.01) |
| *G06K 9/62* | (2022.01) |
| *G06T 7/73* | (2017.01) |
| *B60W 40/06* | (2012.01) |
| *G06V 10/22* | (2022.01) |
| *G06V 20/64* | (2022.01) |
| *G06V 20/62* | (2022.01) |

(52) U.S. Cl.
CPC .......... *G06V 20/588* (2022.01); *B60W 40/06* (2013.01); *G06K 9/6256* (2013.01); *G06T 7/60* (2013.01); *G06T 7/75* (2017.01); *G06V 10/22* (2022.01); *G06V 20/64* (2022.01); *G06V 20/625* (2022.01)

(58) Field of Classification Search
CPC .... G06V 20/588; G06V 20/64; G06V 20/625; G06V 10/22; B60W 40/06; G06K 9/6256; G06T 7/60; G06T 7/75
See application file for complete search history.

(56) References Cited

U.S. PATENT DOCUMENTS

| | | |
|---|---|---|
| 9,758,099 B2 | 9/2017 | Vanfuuren et al. |
| 2015/0088378 A1* | 3/2015 | Sugai ................. B60G 17/0165 701/37 |
| 2020/0408897 A1* | 12/2020 | Westerhoff .............. G01S 13/08 |
| 2021/0342600 A1* | 11/2021 | Westmacott ........... G06V 20/40 |

FOREIGN PATENT DOCUMENTS

| | | | |
|---|---|---|---|
| JP | 2001 325700 A | | 11/2001 |
| JP | 2005178531 A | * | 7/2005 |
| JP | 2005178531 A | | 7/2005 |
| JP | 05262113 B2 | | 8/2013 |
| KR | 1020160061640 | | 6/2016 |
| KR | 1020170030936 | | 3/2017 |
| KR | 101729482 | | 4/2017 |

* cited by examiner

*Primary Examiner* — Casey L Kretzer
(74) *Attorney, Agent, or Firm* — Volentine, Whitt & Francos, PLLC

(57) ABSTRACT

A processing device includes a first processor configured to detect a bounding box of a distant vehicle, in an input image generated by imaging the distant vehicle, and extract at least one feature of the distant vehicle. A second processor is configured to estimate a geometry of a road on which the distant vehicle is located, based on a position of at least one feature relative to at least a portion of the bounding box.

20 Claims, 13 Drawing Sheets

APPARATUS AND METHOD FOR ESTIMATING ROAD GEOMEIRY

CROSS-REFERENCE TO RELATED APPLICATION

This application claims the benefit of Korean Patent Application No. 10-2020-0013304, filed on Feb. 4, 2020, in the Korean Intellectual Property Office, the disclosure of which is incorporated herein in its entirety by reference.

BACKGROUND

The disclosure relates to a technique of collecting information about the driving of a vehicle, and more particularly, to an apparatus and method for estimating a road geometry.

Various pieces of information may be collected for autonomous driving and/or driving assistance. For example, a vehicle may include various sensors configured to sense a state of the vehicle and a surrounding state of the vehicle, and useful information may be generated from outputs of the sensors. The collected information may be utilized in various ways. For instance, the collected information may be used to control the vehicle or provided to a driver of the vehicle. Not only user convenience but also safety may be critical during the driving of the vehicle. Thus, information collected to assist the driving of the vehicle should have high accuracy.

SUMMARY

The disclosure provides an apparatus and method for precisely and easily estimating a geometry of a road on which a vehicle travels.

According to an aspect of the disclosure, a method includes obtaining an input image, the input image being generated by imaging a distant vehicle, detecting a bounding box of the distant vehicle from the input image, extracting at least one feature of the distant vehicle from the input image, and estimating a geometry of a road on which the distant vehicle is located, based on a position of the at least one feature relative to at least a portion of the bounding box.

According to another aspect of the disclosure, there is provided a processing device including a first processor configured to detect a bounding box of a distant vehicle, in an input image generated by imaging the distant vehicle, and extract at least one feature of the distant vehicle. A second processor is configured to estimate a geometry of a road on which the distant vehicle is located, based on a position of at least one feature relative to at least a portion of the bounding box.

According to another aspect of the disclosure, there is provided a vehicle including a camera module configured to image a distant vehicle and generate an input image, a processing device configured to detect a bounding box and at least one feature of the distant vehicle in the input image and estimate a geometry of a road on which the distant vehicle is located, based on a position of the at least one feature relative to at least a portion of the bounding box, and a controller configured to generate a control signal for controlling the vehicle, based on the geometry of the road.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
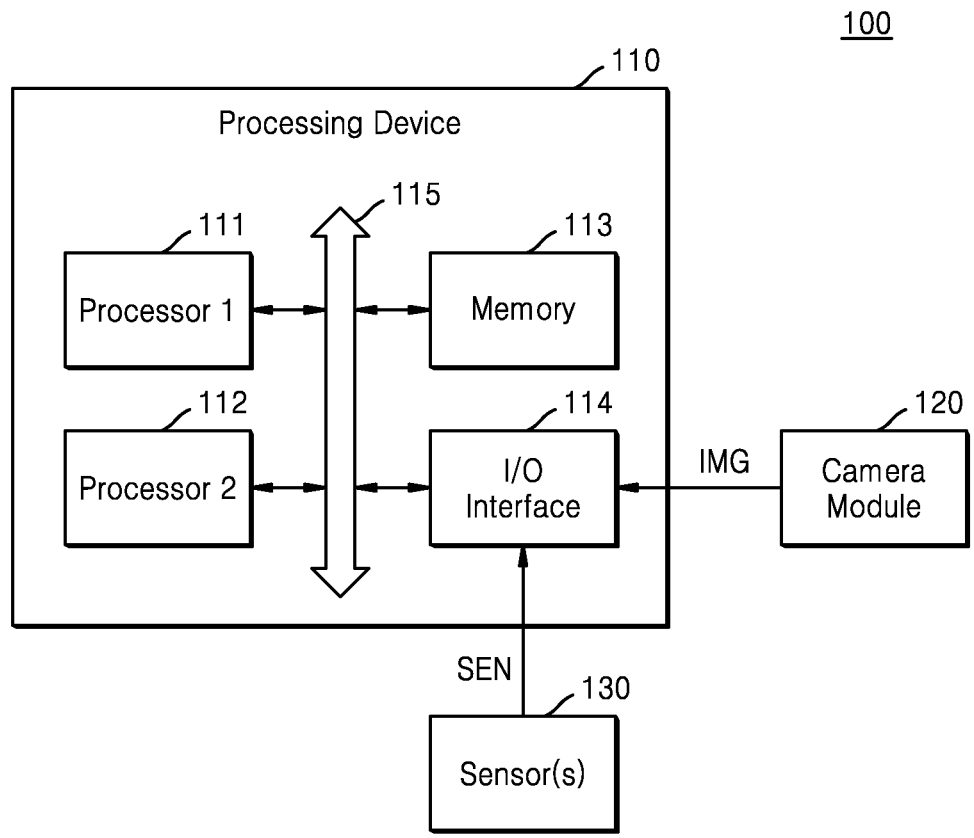
FIG. 1 is a block diagram of a vehicle according to an example embodiment.

FIG. 1 is a block diagram of a vehicle 100 according to an example embodiment. The vehicle 100 may refer to an arbitrary movable object that travels on a road. For example, the vehicle 100 may refer to an object (e.g., a bicycle, a car, a motorcycle, a train, and the like) designed to transport a person or an object or refer to an object designed to be movable for purposes different from transportation. As used herein, a car will mainly be described as an example of the vehicle 100, but it will be understood that example embodiments are not limited thereto. As shown in FIG. 1, the vehicle 100 may include a processing device 110, a camera module 120, and at least one sensor 130. In some embodiments, as described below with reference to FIG. 15, the vehicle 100 may further include various machine parts for driving operations.

The camera module 120 may image (or shoot) another vehicle, which is spaced apart from the vehicle 100, and generate image data IMG. For example, the camera module 120 may be installed to shoot the front of the vehicle 100 and generate image data IMG corresponding to an image including a front vehicle. Also, the camera module 120 may be installed to shoot the rear of the vehicle 100 and generate image data IMG corresponding to an image including a rear vehicle. In some embodiments, the camera module 120 may include an image sensor capable of sensing visible light, and the image data IMG may indicate a visible light image. In some embodiments, the image data IMG may indicate an infrared (IR) image, a grayscale image, and/or a depth image. In some embodiments, the vehicle 100 may include two or more camera modules, and pieces of image data corresponding to various images may be generated. As used herein, a vehicle, which is spaced apart from the vehicle 100 and shot by the camera module 120, may be referred to as a distant vehicle or another vehicle. A distant vehicle located at the front of the vehicle 100 may be referred to as a front vehicle and a distant vehicle located at the rear of the vehicle 100 may be referred to as a rear vehicle. Also, the vehicle 100 including the camera module 120 configured to shoot the distant vehicle may be referred to as a host vehicle.

The at least one sensor 130 may sense a state of the vehicle 100 or a surrounding state of the vehicle 100 and generate a sense signal SEN. In some embodiments, the at least one sensor 130, which is a distance sensor configured to measure a distance from the distant vehicle, may include a light detection and ranging (LIDAR) sensor, a radio detection and ranging (RADAR) sensor, a Time of Flight (ToF) sensor, an ultrasonic sensor, and/or an IR sensor. In some embodiments, to sense a state of the vehicle 100, the at least one sensor 130 may include a geomagnetic sensor, a global positioning system (GPS) sensor, an acceleration sensor, and/or a gyro sensor. Furthermore, in some embodiments, the at least one sensor 130 may further include a pressure sensor and a temperature/humidity sensor. As described below, in some embodiments, the sense signal SEN may be used for the processing device 110 to estimate a geometry of the road.

The processing device 110 may communicate with the camera module 120 and the at least one sensor 130. For example, as shown in FIG. 1, the processing device 110 may receive image data IMG from the camera module 120 or receive a sense signal SEN from the at least one sensor 130. As used herein, the image data IMG received by the processing device 110 from the camera module 120 may be referred to as an input image. The processing device 110 may be an arbitrary electronic device, which may process data and/or a signal. For example, the processing device 110 may be an integrated circuit (IC), which is manufactured using a semiconductor process, or a module including at least two semiconductor packages and a board on which the semiconductor packages are mounted. As shown in FIG. 1, the processing device 110 may include a first processor 111, a second processor 112, a memory 113, and an input/output (I/O) interface 114, which may communicate with each other through a bus 115. In some embodiments, at least two of the first processor 111, the second processor 112, the memory 113, and the I/O interface 114 may directly communicate with each other without using the bus 115. In some embodiments, the bus 115 may be omitted.

The first processor 111 may process the image data IMG and be also referred to as an image processor. For example, the first processor 111 may detect a bounding box of the distant vehicle from the image data IMG. Also, the first processor 111 may extract at least one feature of the distant vehicle from the image data IMG. In some embodiments, the first processor 111 may detect the bounding box and/or extract at least one feature, based on a model learned by a plurality of vehicle images. To this end, in some embodiments, the first processor 111 may include a neural network processing unit (NPU). As described below, a posture of the distant vehicle may be determined based on the bounding box detected by the first processor 111 and the at least one feature extracted by the first processor 111.

The second processor 112 may estimate a geometry of a road on which the distant vehicle is located. For example, the second processor 112 may obtain the bounding box and the at least one feature of the distant vehicle from the first processor 111, determine the posture of the distant vehicle, based on a position of at least one feature relative to at least a portion of the bounding box, and estimate the geometry of the road on which the distant vehicle is located, based on the posture of the distant vehicle. Also, the second processor 112 may compensate for the estimated geometry of the road, based on the state of the vehicle 100. As described below with reference to FIGS. 15 and 16, the geometry of the road, which is estimated by the second processor 112, may be utilized for various functions that are useful for driving the vehicle 100. For instance, the second processor 112 may assist lane detection based on the estimated geometry of the road.

In some embodiments, each of the first processor 111 and the second processor 112 may include a hardware logic designed by logic synthesis. Also, in some embodiments, each of the first processor 111 and the second processor 112 may include at least one core, which executes instructions stored in an internal memory of the first processor 111 and/or the memory 113. For example, each of the first processor 111 and the second processor 112 may refer to an arbitrary hardware-implemented data processing device including a circuit that is physically configured to execute predetermined operations including operations expressed by instructions and/or code, which are included in a program. For example, the data processing device may include a microprocessor (MP), a central processing unit (CPU), a graphics processing unit (GPU), a neural processing unit (NPU), a processor core, a multi-core processor, a multi-processor, an application-specific integrated circuit (ASIC), an application-specific instruction-set processor (ASIP), and a field programmable gate array (FPGA). In some embodiments, unlike that shown in FIG. 1, the processing device 110 may include a single processor configured to perform all operations of the first processor 111 and the second processor 112. As used herein, operations performed by the first processor 111 and/or the second processor 112 may also be referred to as operations performed by the processing device 110.

The memory 113 may store data, which is processed or to be processed by the first processor 111 and the second processor 112 or data, which is received through the I/O interface 114 or is to be transmitted to the outside. For example, the memory 113 may store image data IMG, which is provided by the camera module 120, store data about the bounding box and the at least one feature of the distant vehicle, which are generated by the first processor 111, or store data about the geometry of the road, which is generated by the second processor 112. In some embodiments, the memory 113 may store a series of instructions, which are executed by the first processor 111 and the second processor 112. In some embodiments, the memory 113 may include a volatile memory device, such as dynamic random access memory (DRAM) and static RAM (SRAM). In some embodiments, the memory 113 may include a non-volatile memory device, such as electrically erasable programmable read-only memory (EEPROM), silicon-oxide-nitride-oxide-silicon (SONOS) memory, polymer memory, magnetic RAM (MRAM), phase-change RAM (PRAM), and/or resistive RAM (RRAM).

The I/O interface 114 may provide an interface with an external component of the processing device 110. For example, as shown in FIG. 1, the I/O interface 114 may provide an interface with the camera module 120 or provide an interface with the at least one sensor 130. In some embodiments, the I/O interface 114 may provide an interface for outputting the geometry of the road, which is estimated by the second processor 112.

Figure 2:
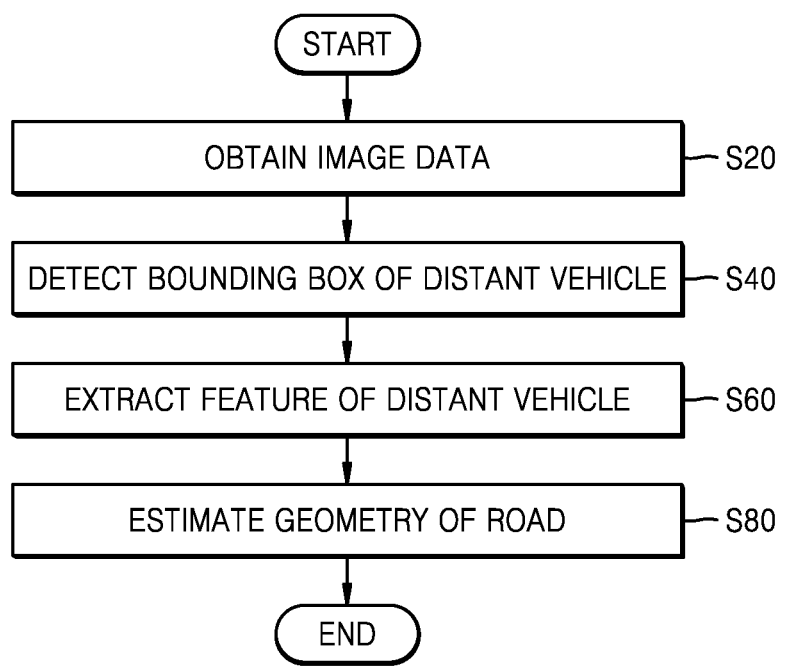
FIG. 2 is a flowchart of a method of estimating a road geometry, according to an example embodiment.

FIG. 2 is a flowchart of a method of estimating a road geometry, according to an example embodiment. As shown in FIG. 2, the method of estimating the road geometry may include a plurality of operations (e.g., S20, S40, S60, and S80). In some embodiments, the method of FIG. 2 may be performed by the processing device 110 of FIG. 1. Hereinafter, FIG. 2 will be described with reference to FIG. 1.

In operation S20, an operation of obtaining image data IMG may be performed. For example, the processing device 110 may receive image data IMG, which is generated by shooting a distant vehicle by using the camera module 120, from the camera module 120. In some embodiments, operation S20 may be performed after operation S40 or performed in parallel with operation S40.

In operation S40, an operation of detecting a bounding box of the distant vehicle may be performed. For example, the processing device 110 may detect the bounding box of the distant vehicle in the image data IMG. In some embodiments, the bounding box of the distant vehicle may include a pair of lateral lines and a pair of vertical lines and define a minimum region including the distant vehicle. Examples of the bounding box will be described below with reference to FIG. 3. The bounding box of the distant vehicle may be detected from the image data IMG, based on an arbitrary method of detecting a specific object from an image, and an example of operation S40 will be described below with reference to FIG. 4.

In operation S60, an operation of extracting a feature of the distant vehicle may be performed. For example, the processing device 110 may extract at least one feature of the distant vehicle from the bounding box of the distant vehicle. In some embodiments, the processing device 110 may extract a headlamp, a tail lamp, a license plate, a side mirror, and a wheel of the distant vehicle as the feature of the distant vehicle. The feature of the distant vehicle may be extracted from the image data IMG, based on an arbitrary method of extracting a feature from an image, and examples of the extracted feature will be described below with reference to FIGS. 5A to 5C.

In operation S80, an operation of estimating a geometry of a road may be performed. For example, the processing device 110 may estimate a geometry of a road on which the distant vehicle is located, based on a position of at least one feature relative to at least a portion of the bounding box of the distant vehicle. The position of the at least one feature may indicate a posture of the distant vehicle, and the processing device 110 may estimate the geometry of the road, based on the posture of the distant vehicle. Thus, the geometry of the road may be estimated based on one piece of image data IMG, and a plurality of camera modules may be prevented from being included in the vehicle 100 to estimate the geometry of the road. Also, when the distant vehicle is preceding the vehicle 100 on a route in which the vehicle 100 travels, a geometry of a road on which the vehicle 100 will travel may be estimated in advance. Furthermore, the geometry of the road may be accurately estimated based on not only the position of the distant vehicle but also the posture of the distant vehicle. In some embodiments, the geometry of the road may include a profile (or height profile) of the road, which indicates road undulations, and/or a cross slope (or road angle) of the road. Examples of operation S80 will be described below with reference to FIGS. 6, 8, 10, 12, and 13. In some embodiments, operation S80 may include all operations shown in FIGS. 6, 8, 10, 12, and 13.

Figure 3:
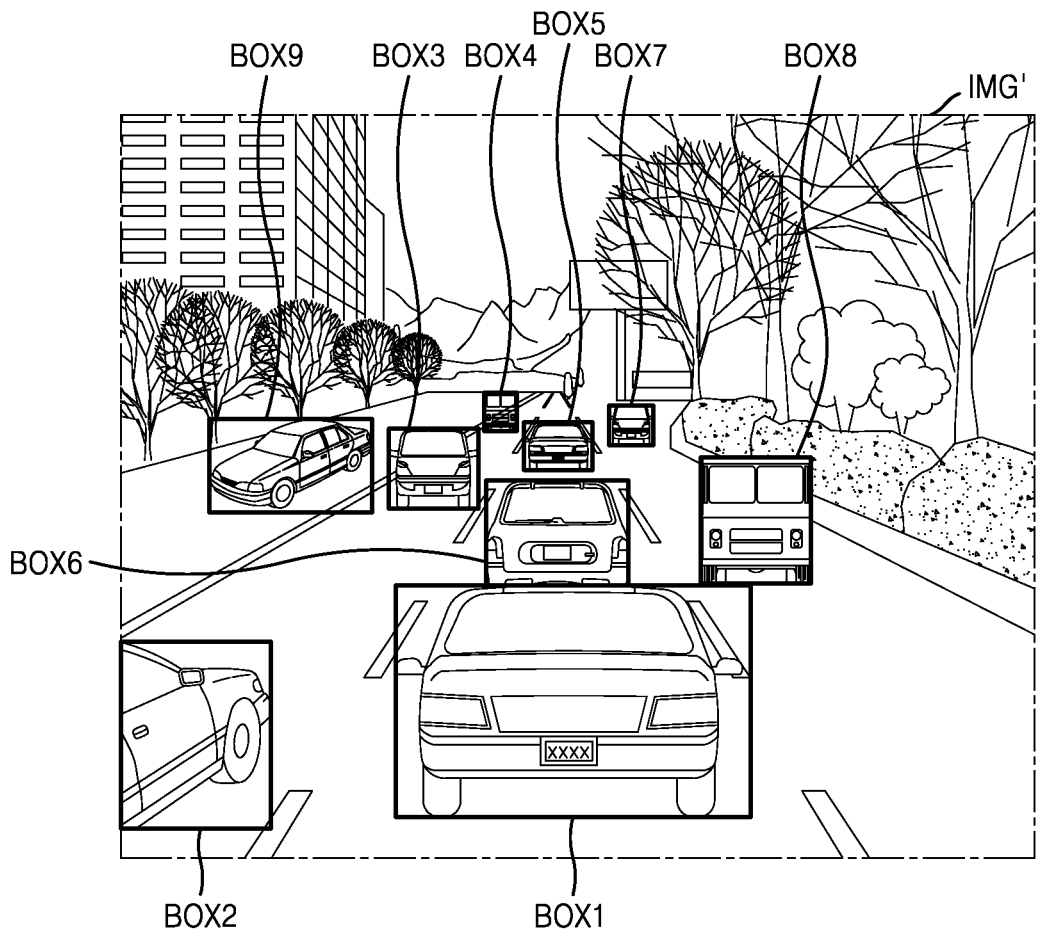
FIG. 3 illustrates examples of image data and a bounding box according to an example embodiment.

FIG. 3 illustrates examples of image data and a bounding box according to an example embodiment. As described above with reference to FIG. 1, image data IMG' of FIG. 3 may be generated by shooting a distant vehicle by using the camera module 120, and the processing device 110 may detect a bounding box of the distant vehicle in the image data IMG'. Hereinafter, FIG. 3 will be described with reference to FIG. 1. Also, it is assumed that the camera module 120 is arranged to shoot the front of the vehicle 100 and the distant vehicle is a front vehicle.

In some embodiments, the image data IMG' may be generated by shooting a plurality of front vehicles, and the processing device 110 may detect a plurality of bounding boxes corresponding respectively to the plurality of front vehicles. For example, as shown in FIG. 3, the processing device 110 may detect bounding boxes BOX1, BOX5, and BOX6 of front vehicles located on the same lane as the vehicle 100, detect bounding boxes BOX2, BOX3, BOX4, BOX7, and BOX8 of front vehicles located on different lanes from the vehicle, or detect a bounding box BOX9 of a front vehicle that travels in an opposite direction to the vehicle 100. As described above with reference to FIG. 2, each of the bounding boxes BOX1 to BOX9 may include a pair of lateral lines and a pair of vertical lines. Thus, each of the bounding boxes BOX1 to BOX9 may be defined by a pair of points facing each other in a diagonal direction. As shown in FIG. 3, each of the bounding boxes BOX1 to BOX9 may have different sizes due to a distance from the vehicle 100 to the front vehicle and a size of the front vehicle.

Figure 4:
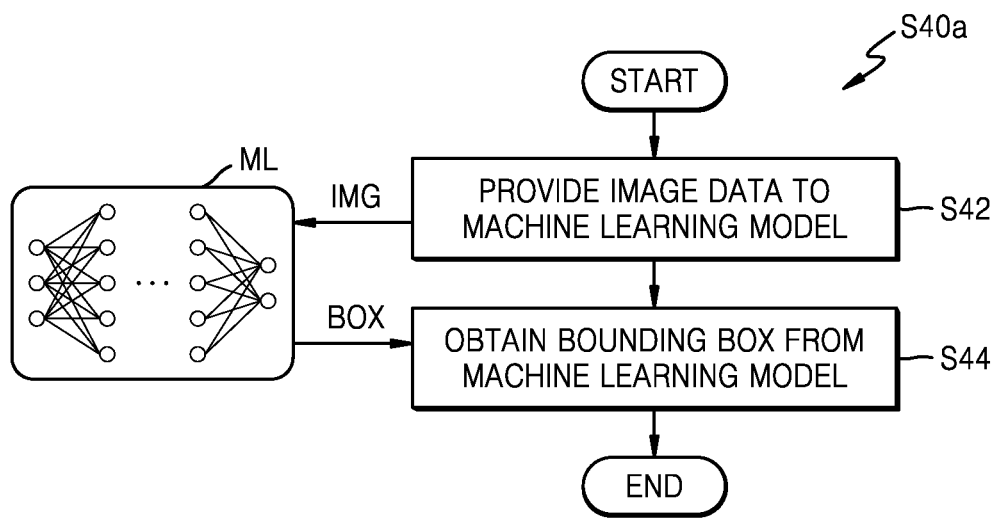
FIG. 4 is a flowchart of a method of estimating a road geometry, according to an example embodiment.

FIG. 4 is a flowchart of a method of estimating a road geometry, according to an example embodiment. Specifically, the flowchart of FIG. 4 illustrates an example of operation S40 of FIG. 2. As described above with reference to FIG. 2, an operation of detecting a bounding box of a distant vehicle may be performed in operation S40a of FIG. 4. As shown in FIG. 4, operation S40a may include operations S42 and S44. FIG. 4 will be described with reference to FIG. 1.

Referring to FIG. 4, in operation S42, an operation of providing image data IMG to a machine learning model ML learned from vehicle images may be performed. That is, a bounding box of a distant vehicle may be detected from the image data IMG, based on machine learning, and the machine learning model ML learned from the vehicle images may have an arbitrary structure for machine learning. For example, the machine learning model ML may include an artificial neural network, a convolution neural network, a deep neural network, a decision tree, a support vector machine, a Bayesian network, and/or a genetic algorithm. In some embodiments, the first processor 111 may include a component (e.g., an NPU) configured to implement at least a portion of the machine learning model ML.

In operation S44, an operation of obtaining a bounding box BOX from the machine learning model ML may be performed. For example, the machine learning model ML may generate coordinates of a pair of points defining a bounding box BOX of a distant vehicle in the image data IMG. In some embodiments, as described above with reference to FIG. 3, a plurality of bounding boxes corresponding to a plurality of distant vehicles in the image data IMG may be obtained from the machine learning model ML.

Figure 5A:
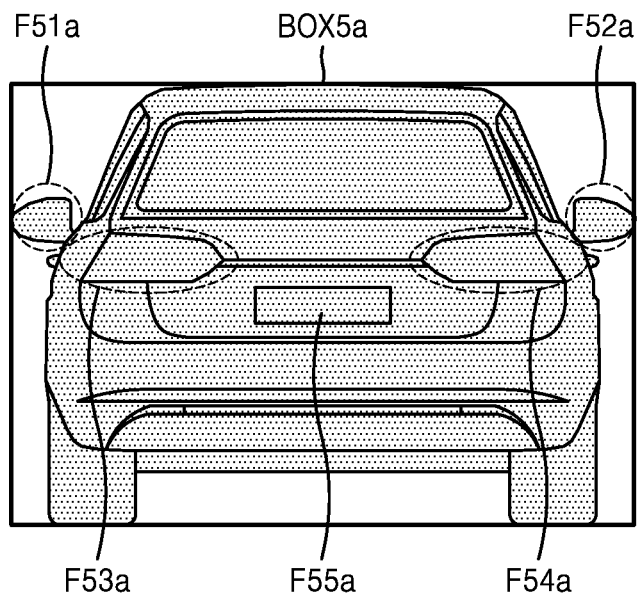
FIGS. 5A to 5C are diagrams of examples of a bounding box and a feature according to an example embodiment.
Figure 5B:
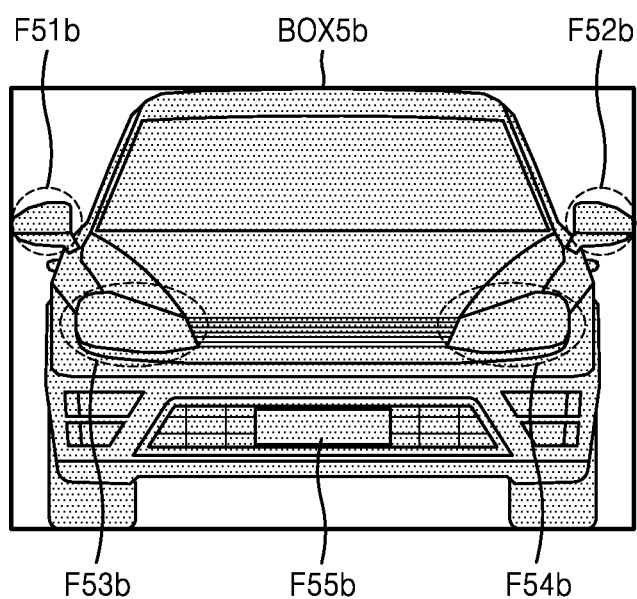
Figure 5C:
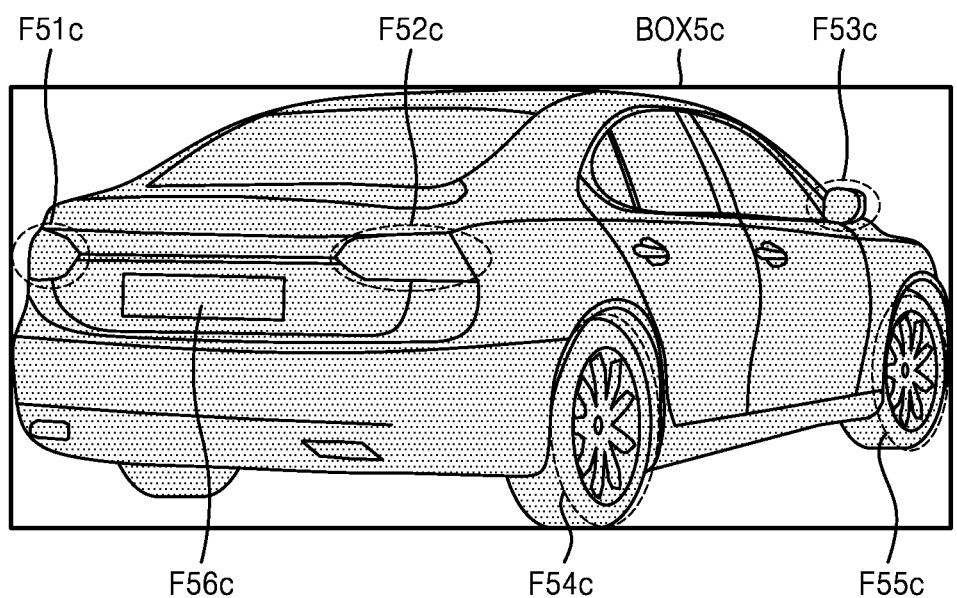

FIGS. 5A to 5C are diagrams of examples of a bounding box and a feature according to an example embodiment. Specifically, FIG. 5A illustrates a bounding box BOX5a and features F51a to F55a, which correspond to a rear surface of a distant vehicle, FIG. 5B illustrates a bounding box BOX5b and features F51b to F55b, which correspond to a front surface of the distant vehicle, and FIG. 5C illustrates a bounding box BOX5c and features F51c to F56c, which correspond to the rear surface and a side surface of the distant vehicle. Hereinafter, FIGS. 5A to 5C will be described with reference to FIG. 1. A repeated description will be omitted in the description of FIGS. 5A to 5C.

Referring to FIG. 5A, the bounding box BOX5a may include the rear surface of the distant vehicle. For example, the camera module 120 may be arranged to shoot the front of the vehicle 100. The camera module 120 may shoot a rear surface of the front vehicle preceding the vehicle 100 and generate image data IMG. Thus, the processing device 110 may detect the bounding box BOX5a including the rear surface of the front vehicle and extract the features F51a to F55a in the bounding box BOX5a. For example, as shown in FIG. 5A, the processing device 110 may extract the features F51a and F52a corresponding to a side mirror, the features F53a and F54a corresponding to a tail lamp, and the feature F55a corresponding to a license plate from the image data IMG. In some embodiments, the processing device 110 may extract only some of the features F51a to F55a of FIG. 5A or further extract additional features (e.g., a wheel or the like) in addition to the features F51a to F55a of FIG. 5A.

Referring to FIG. 5B, the bounding box BOX5b may include the front surface of the distant vehicle. For example, the camera module 120 may be arranged to shoot the rear of the vehicle 100. The camera module 120 may shoot a front surface of a rear vehicle following the vehicle 100 and generate image data IMG. Thus, the processing device 110 may detect the bounding box BOX5b including the front surface of the rear vehicle and extract the features F51b to F55b from the bounding box BOX5b. For example, as shown in FIG. 5B, the processing device 110 may extract the features F51b and F52b corresponding to the side mirror, the features F53b and F54b corresponding to a headlamp, and the feature F55b corresponding to the license plate from the image data IMG. In some embodiments, the processing device 110 may extract only some of the features F51b to F55b of FIG. 5B or further extract additional features (e.g., a wheel, a fog light, or the like) in addition to the features F51b to F55b of FIG. 5B.

Referring to FIG. 5C, the bounding box BOX5c may include the side surface and the rear surface of the distant vehicle. For example, the camera module 120 may be arranged to shoot the front of the vehicle 100. The camera module 120 may shoot a distant vehicle, which is traveling on a different lane from the vehicle 100 or stopped on the side of a road and generate image data IMG. Thus, the processing device 110 may detect the bounding box BOX5c including the rear surface and the side surface of the distant vehicle and extract the features F51c to F56c in the bounding box BOX5c. For example, as shown in FIG. 5C, the processing device 110 may extract the features F51c and F52c corresponding to the tail lamp, the feature F53c corresponding to the side mirror, the features F54c and F55c corresponding to a wheel, and the feature F56c corresponding to the license plate from the image data IMG. In some embodiments, the processing device 110 may extract only some of the features F51c to F56c of FIG. 5C or further extract additional features in addition to the features F51c to F56c of FIG. 5C.

As described above with reference to FIGS. 1 and 2, the extracted features of the distant vehicle may be used to determine the posture of the distant vehicle and used to estimate the geometry of the road on which the distant vehicle is located. Hereinafter, a feature corresponding to the license plate will be mainly described as an example of the feature of the distant vehicle, but it will be understood that example embodiments are not limited thereto. In addition, although not shown in FIGS. 5A to 5C, in some embodiments, a bounding box including the front surface and the side surface of the distant vehicle may be detected from image data IMG, which is generated by the camera module 120 located to shoot the rear of the vehicle 100, and features may be featured in the bounding box. Hereinafter, a feature corresponding to a specific portion of the distant vehicle may be simply referred to as the corresponding specific portion. For example, a feature corresponding to the license plate of the distant vehicle may be simply referred to as the license plate of the distant vehicle.

Figure 6:
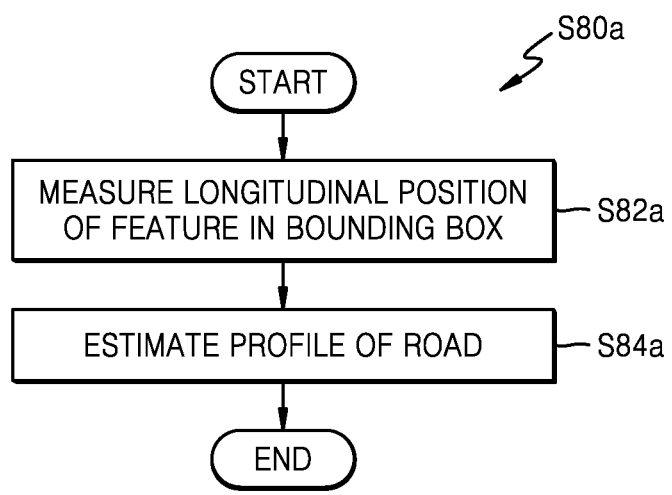
FIG. 6 is a flowchart of a method of estimating a road geometry, according to an example embodiment.
Figure 7A:
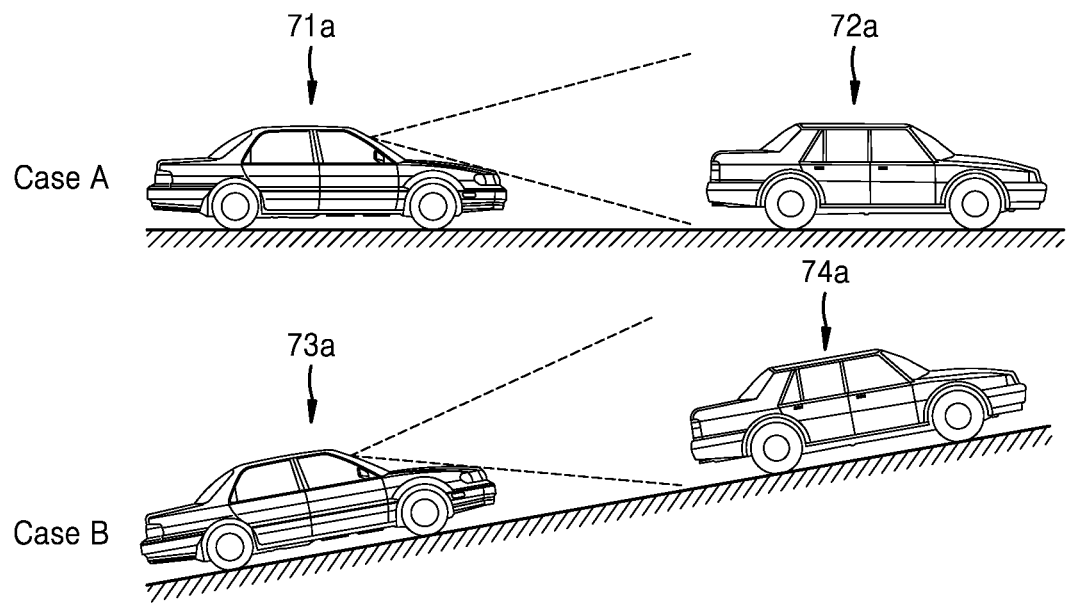
FIGS. 7A to 7C are diagrams of examples of a road geometry and image data according to example embodiments.
Figure 7A:
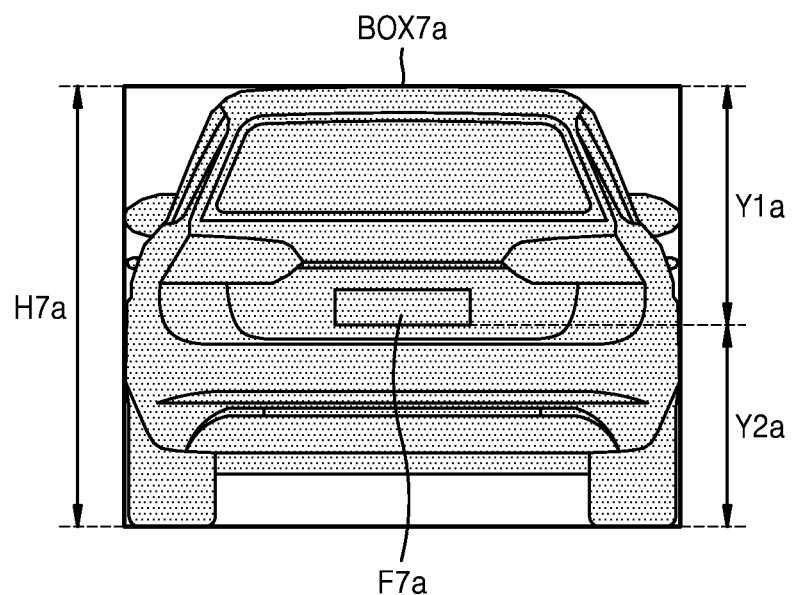
Figure 7B:
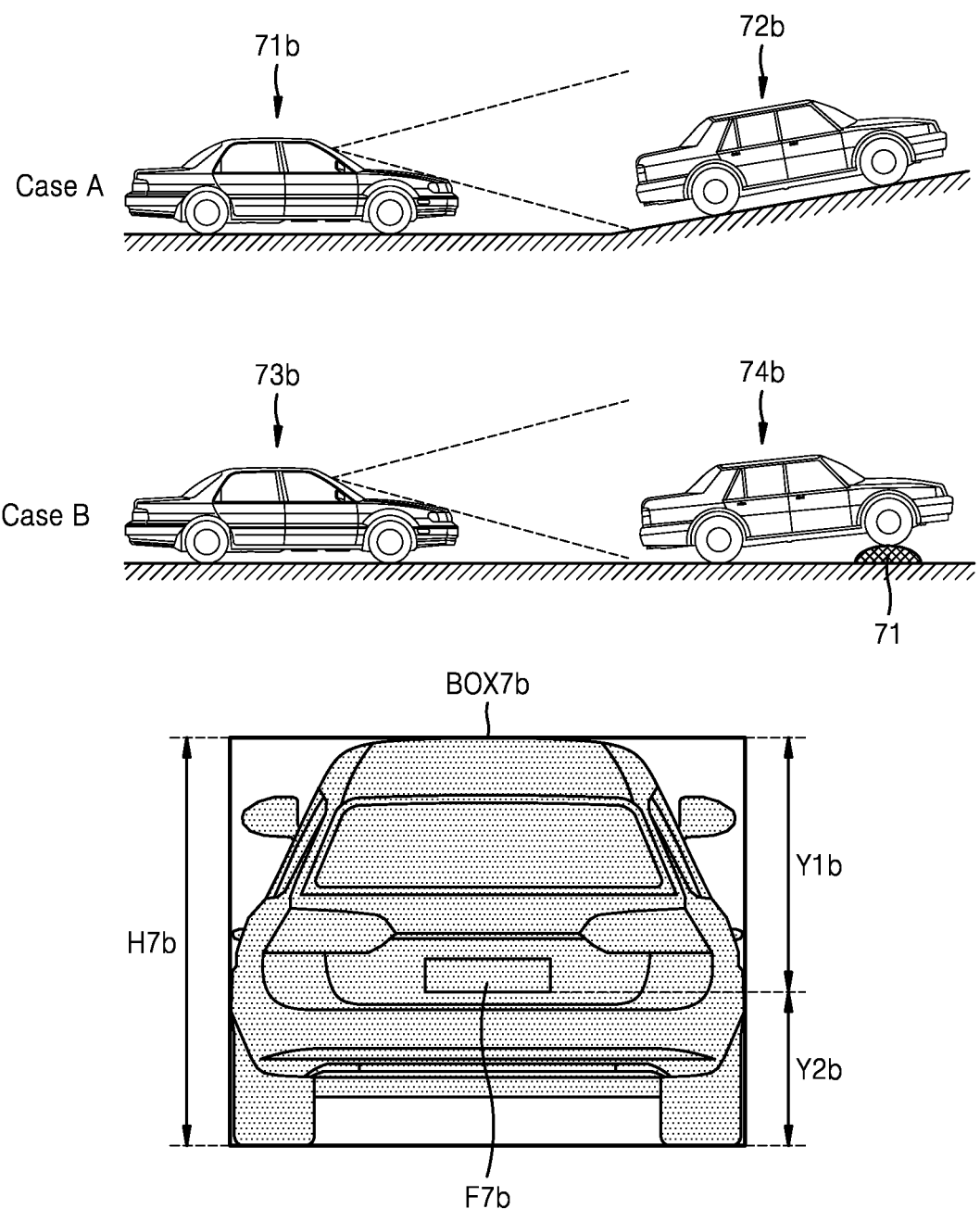
Figure 7C:
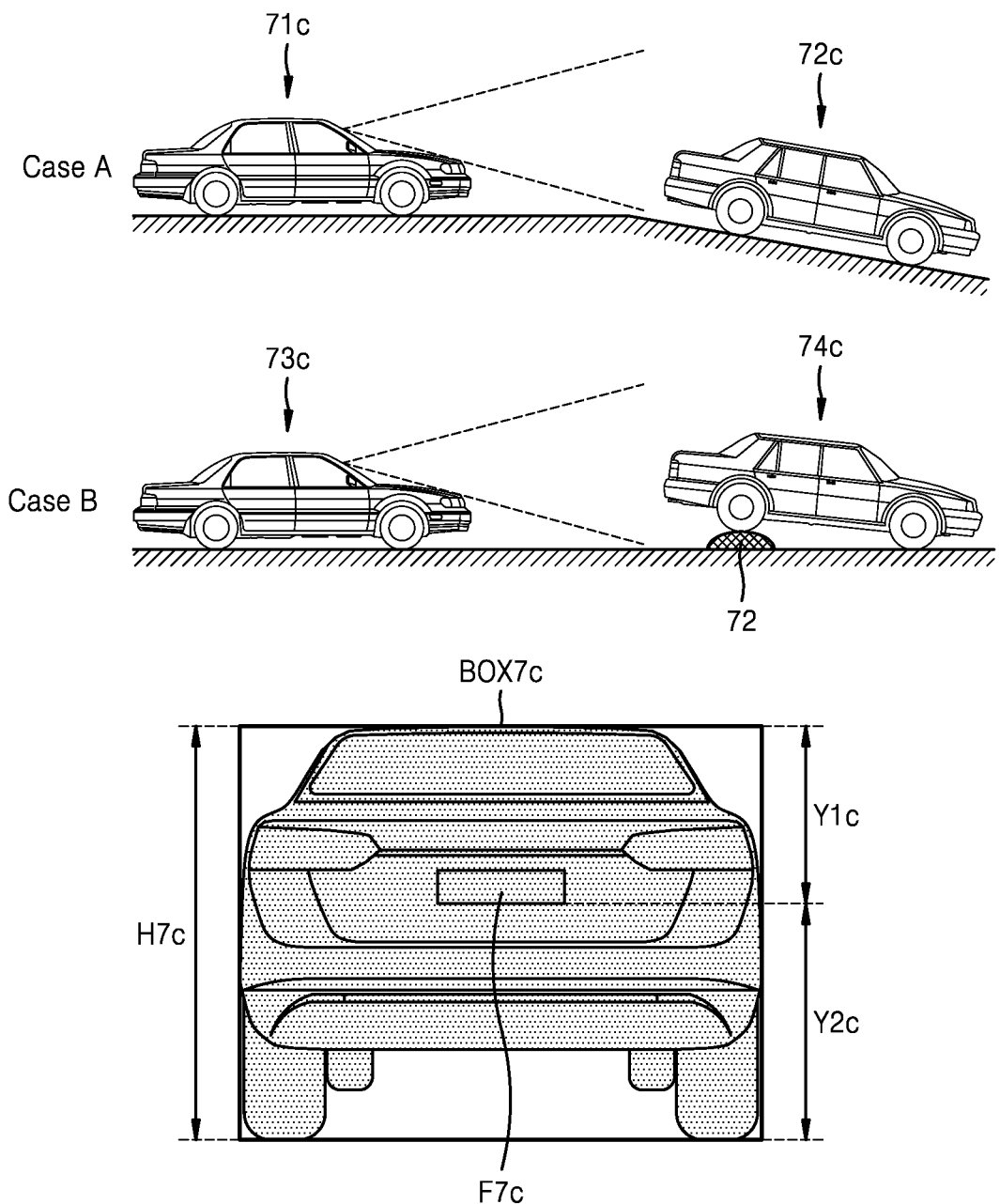

FIG. 6 is a flowchart of a method of estimating a road geometry, according to an example embodiment. FIGS. 7A to 7C are diagrams of examples of a road geometry and image data according to example embodiments. Specifically, the flowchart of FIG. 6 illustrates an example of operation S80 of FIG. 2. FIGS. 7A to 7C illustrate examples of the arrangement of host vehicles 71a, 73a, 71b, 73b, 71c, and 73c and front vehicles 72a, 74a, 72b, 74b, 72c, and 74c, and bounding boxes BOX7a, BOX7b, and BOX7c and features F7a, F7b, and F7c, which correspond thereto. As described above with reference to FIG. 2, an operation of estimating a geometry of a road may be performed in operation S80a of FIG. 6. Hereinafter, the host vehicles 71a, 73a, 71b, 73b, 71c, and 73c of FIGS. 7A to 7C will be assumed to include the processing device 110 and the camera module 120 of FIG. 1. FIGS. 6 and 7A to 7C will be described with reference to FIG. 1.

Referring to FIG. 6, operation S80a may include operations S82a and S84a. In operation S82a, an operation of measuring a longitudinal position of a feature in a bounding box may be performed. Hereinafter, as described below with reference to FIGS. 7A to 7C, a posture of a distant vehicle may be changed due to the geometry of the road, and thus, the longitudinal position of the feature of the distant vehicle may be changed due to a profile of the road.

Referring to the upper portion of FIG. 7A, in Case A, the host vehicle 71a and the front vehicle 72a may travel on a flat, horizontal road. Also, in Case B, the host vehicle 73a and the front vehicle 74a may travel on a flat, uphill road. That is, in Cases A and B of FIG. 7A, the host vehicles 71a and 73a and the front vehicles 72a and 74a may be traveling on a road having the same geometry. When rear surfaces of the front vehicles 72a and 74a are shot at the host vehicles 71a and 73a, similar images may be obtained.

Referring to the lower portion of FIG. 7A, in Case A or Case B of FIG. 7A, the processing device 110 may detect the bounding box BOX7a including the rear surface of the front vehicle 72a or 74a and extract the license plate F7a as a feature. The bounding box BOX7a may have a height H7a, and the processing device 110 may measure a first distance Y1a from a top of the bounding box BOX7a to a bottom of the license plate F7a and/or a second distance Y2a from the bottom of the license plate F7a to a bottom of the bounding box BOX7a. In some embodiments, unlike that shown in FIG. 7A, the processing device 110 may measure a longitudinal position of a center or a top of the license plate F7a in the bounding box BOX7a.

The processing device 110 may define the longitudinal position of the feature by various metrics. For example, the processing device 110 may define the longitudinal position of the license plate F7a by the first distance Y1a or the second distance Y2a, a ratio between the first distance Y1a and the second distance Y2a, or a ratio of the first distance Y1a or the second distance Y2a to the height H7a of the bounding box BOX7a. In some embodiments, the processing device 110 may measure each of longitudinal positions of a plurality of features (e.g., a license plate and a tail lamp) and calculate one metric from the measured longitudinal positions. Hereinafter, it is assumed that the processing device 110 measures a ratio Y2a/Y1a of the second distance Y2a to the first distance Y1a as the longitudinal position of the license plate F7a. However, example embodiments are not limited thereto.

Referring to the upper portion of FIG. 7B, in Case A, the host vehicle 71b may be traveling at a flat, horizontal position of the road, while the front vehicle 72b may be traveling on at a flat, uphill position of the road. Also, in Case B, the host vehicle 73b may be traveling at the flat, horizontal position of the road, while the front vehicle 74b may be traveling on a bump 71 of the road, and a front wheel of the front vehicle 74b may be on the bump 71. Thus, each of the front vehicles 72b and 74b may have a posture with a front portion elevated. In Cases A and B of FIG. 7B, when rear surfaces of the front vehicles 72b and 74b are shot at the host vehicles 71b and 73b, similar images may be obtained.

Referring to the lower portion of FIG. 7B, in Cases A and B of FIG. 7B, the processing device 110 may detect the bounding box BOX7b including the rear surface of the front vehicle 72b or 74b and extract the license plate F7b as a feature. The bounding box BOX7b may have a height H7b, and the processing device 110 may measure a first distance Y1b from a top of the bounding box BOX7b to a bottom of the license plate F7b and/or a second distance Y2b from a bottom of the bounding box BOX7b to the bottom of the license plate F7b. As compared to the bounding box BOX7a of FIG. 7A, the bounding box BOX7b of FIG. 7B may further include a portion of a top surface of the front vehicle 72b or 74b due to the posture of the front vehicle 72b or 74b. In addition, as compared to the license plate F7a of FIG. 7A, the license plate F7b of FIG. 7B may be located relatively lower in the bounding box BOX7b due to the posture of the front vehicle 72b or 74b. Thus, a longitudinal position (Y2b/Y1b) of the license plate F7b of FIG. 7B may be lower than the longitudinal position (Y2a/Y1a) of the license plate F7a of FIG. 7A (Y2b/Y1b<Y2a/Y1a).

Referring to the upper portion of FIG. 7C, in Case A, the host vehicle 71c may be traveling at a flat, horizontal position of the road, while the front vehicle 72c may be traveling at a flat, downhill position of the road. Also, in Case B, the host vehicle 73c may be traveling at a flat, horizontal position of the road, while the front vehicle 74c may be traveling on a bump 72 of the road, and a rear wheel of the front vehicle 74c may be on the bump 72. Thus, each of the front vehicles 72c and 74c may have a posture with the rear portion elevated. In Cases A and B of FIG. 7C, when rear surfaces of the front vehicles 72c and 74c are shot at the host vehicles 71c and 73c, similar images may be obtained.

Referring to the lower portion of FIG. 7C, in Cases A and B of FIG. 7C, the processing device 110 may detect the bounding box BOX7c including a rear surface of the front vehicle 72c or 74c and extract the license plate F7c as a feature. The bounding box BOX7c may have a height H7c, and the processing device 110 may measure a first distance Y1c from a top of the bounding box BOX7c to a bottom of the license plate F7c and/or a second distance Y2c from a bottom of the bounding box BOX7c to the bottom of the license plate F7c. As compared to the bounding box BOX7a of FIG. 7A, the bounding box BOX7c of FIG. 7C may further include a portion of a bottom surface of the front vehicle 72c or 74c due to the posture of the front vehicle 72c or 74c. In addition, as compared to the license plate F7a of FIG. 7A, the license plate F7c of FIG. 7C may be located relatively higher in the bounding box BOX7c due to the posture of the front vehicle 72c or 74c. Thus, a longitudinal position (Y2c/Y1c) of the license plate F7c of FIG. 7 may be higher than the longitudinal position (Y2a/Y1a) of the license plate F7a of FIG. 7A (Y2c/Y1c>Y2a/Y1a).

Referring back to FIG. 6, in operation S84a, an operation of estimating a profile of a road may be performed. For example, as described above with reference to FIGS. 7A to 7C, the processing device 110 may estimate the profile of the road, which indicates road undulations, based on a longitudinal position of a license plate that varies depending on a posture of a front vehicle. For example, the processing device 110 may estimate that a profile of a point on which the front vehicle is located is the same as a profile of a point on which a host vehicle is located, based on the longitudinal position (Y2a/Y1a) of the license plate F7a of FIG. 7A. Also, based on the longitudinal position (Y2b/Y2a) of the license plate F7b of FIG. 7B, the processing device 110 may estimate that the point on which the front vehicle is located has an ascent or a bump. Furthermore, based on the longitudinal position (Y2c/Y1c) of the license plate F7c of FIG. 7C, the processing device 110 may estimate that the point on which the front vehicle is located has a descent or a bump. In some embodiments, as described below with reference to FIG. 10, the processing device 110 may estimate a front position of the estimated profile of the road, based on a distance from the front vehicle. As described below with reference to FIG. 12, the profile of the road may be compensated for based on a state of a host vehicle. As described below with reference to FIG. 13, the profile of the road may be estimated based on a difference between a previous longitudinal position and a current longitudinal position of the license plate.

Figure 8:
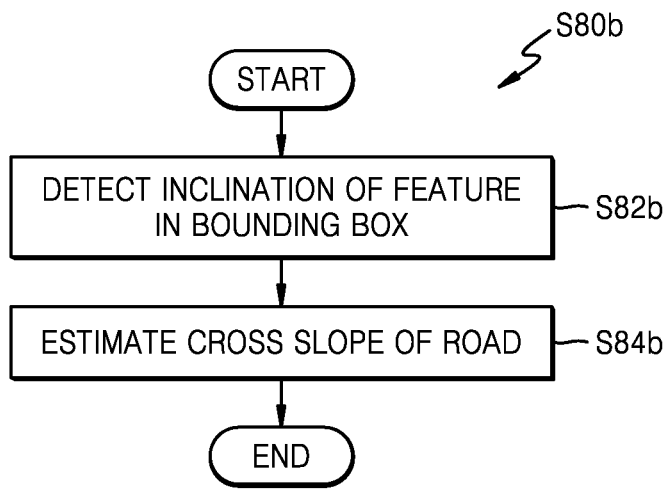
FIG. 8 is a flowchart of a method of estimating a road geometry, according to an example embodiment.
Figure 9:
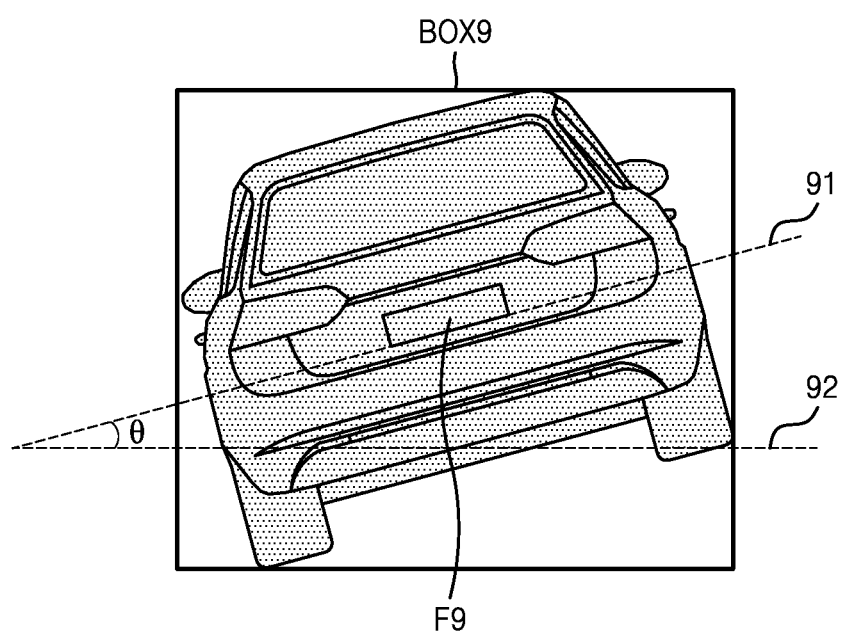
FIG. 9 illustrates an example of image data according to an example embodiment.

FIG. 8 is a flowchart of a method of estimating a road geometry, according to an example embodiment. FIG. 9 illustrates an example of image data according to an example embodiment. Specifically, the flowchart of FIG. 8 illustrates an example of operation S80 of FIG. 2, and FIG. 9 illustrates a bounding box BOX9 and a license plate F9 serving as a feature in image data that is generated by shooting a front vehicle. As described above with reference to FIG. 2, an operation of estimating a geometry of a road may be performed in operation S80b of FIG. 8. Hereinafter, FIGS. 8 and 9 will be described with reference to FIG. 1.

Referring to FIG. 8, operation S80b may include operations S82b and S84b. In operation S82b, an operation of detecting a slope of a feature in a bounding box may be performed. For example, referring to FIG. 9, the bounding box BOX9 including a rear surface of the front vehicle may be detected, and the license plate F9 may be extracted as the feature in the bounding box BOX9. As shown in FIG. 9, the license plate F9 may have an inclination, which is rotated by an angle θ from the horizon (or a horizontal line of the bounding box BOX9) in a counterclockwise direction, and the front vehicle may also be determined to be rotated by an angle θ from the horizon in the counterclockwise direction. In some embodiments, the processing device 110 may detect a first line 91 parallel to the license plate F9 and measure an angle θ formed by a second line 92 corresponding to the horizon with the first line 91.

In operation S84b, an operation of estimating a cross slope of a road may be performed. For example, as shown in FIG. 9, when the front vehicle is rotated by an angle θ in the counterclockwise direction, the processing device 110 may estimate a cross slope of a road, which is inclined by an angle θ in the counterclockwise direction. In some embodiments, as described below with reference to FIG. 10, the processing device 110 may estimate a front position at which the cross slope of the road is estimated, based on a distance from the front vehicle. As described below with reference to FIG. 12, the processing device 110 may estimate the cross slope of the road, based on a state of the host vehicle. As described below with reference to FIG. 13, the cross slope of the road may be estimated based on a difference between a previous inclination and a current inclination of the license plate F9.

Figure 10:
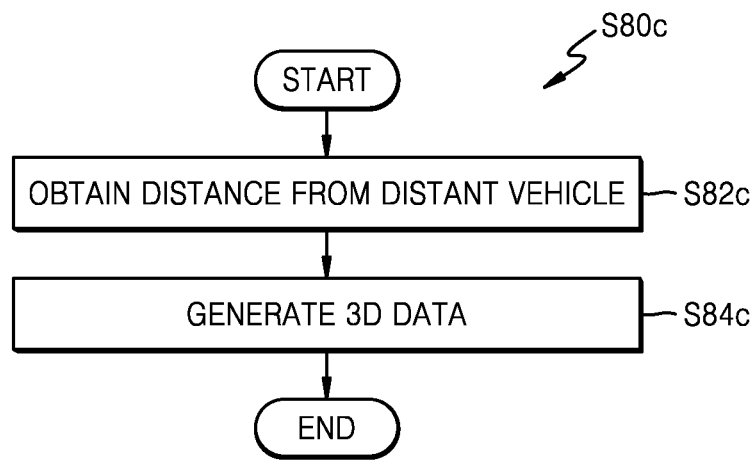
FIG. 10 is a flowchart of a method of estimating a road geometry, according to an example embodiment.

FIG. 10 is a flowchart of a method of estimating a road geometry, according to an example embodiment. Specifically, the flowchart of FIG. 10 illustrates an example of operation S80 of FIG. 2. As described above with reference to FIG. 2, an operation of estimating a geometry of a road may be performed in operation S80c of FIG. 10. As shown in FIG. 10, operation S80c may include operations S82c and S84c and will be described below with reference to FIG. 1.

In operation S82c, an operation of obtaining a distance from a distant vehicle may be performed. In some embodiments, the at least one sensor 130 may include a distance sensor configured to measure a distance from the distant vehicle, and the processing device 110 may obtain the distance from the distant vehicle, based on a sense signal SEN provided by the at least one sensor 130. In some embodiments, the processing device 110 may estimate the distance from the distant vehicle, based on image data IMG provided by the camera module 120. For example, a size and a position of a bounding box of the distant vehicle in the image data IMG may depend on a distance from the distant vehicle, and thus, the processing device 110 may estimate the distance from the distant vehicle, based on at least one of the size and the position of the bounding box. In some embodiments, the processing device 110 may obtain the distance from the distant vehicle, based on both the sense signal SEN and the image data IMG.

In some embodiments, the processing device 110 may convert the image data IMG into data corresponding to a top-view image. In the top-view image, distant vehicles may be arranged according to a distance from a host vehicle. For example, the processing device 110 may convert the image data IMG into the data corresponding to the top-view image, based on a homography matrix and inverse perspective mapping.

In operation S84c, an operation of generating three-dimensional (3D) data may be performed. For example, the processing device 110 may generate 3D data indicating the estimated geometry of the road and store the 3D data in the memory 113. As described above, 3D data indicating a road geometry may be utilized for useful functions. Examples of the road geometry indicated by the 3D data will be described below with reference to FIGS. 11A and 11B.

Figure 11A:
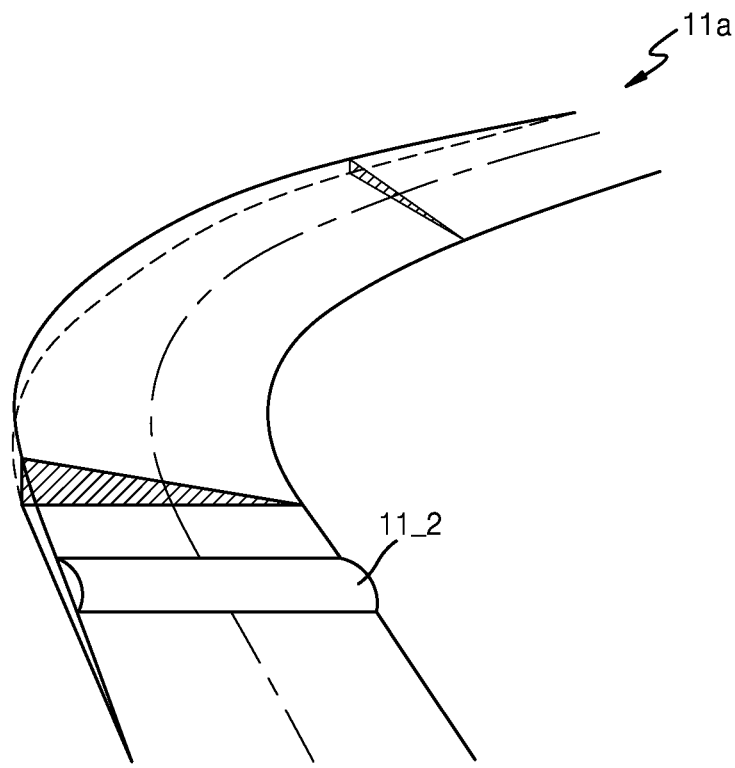
FIGS. 11A and 11B illustrate examples of a road geometry that is estimated according to example embodiments.
Figure 11B:
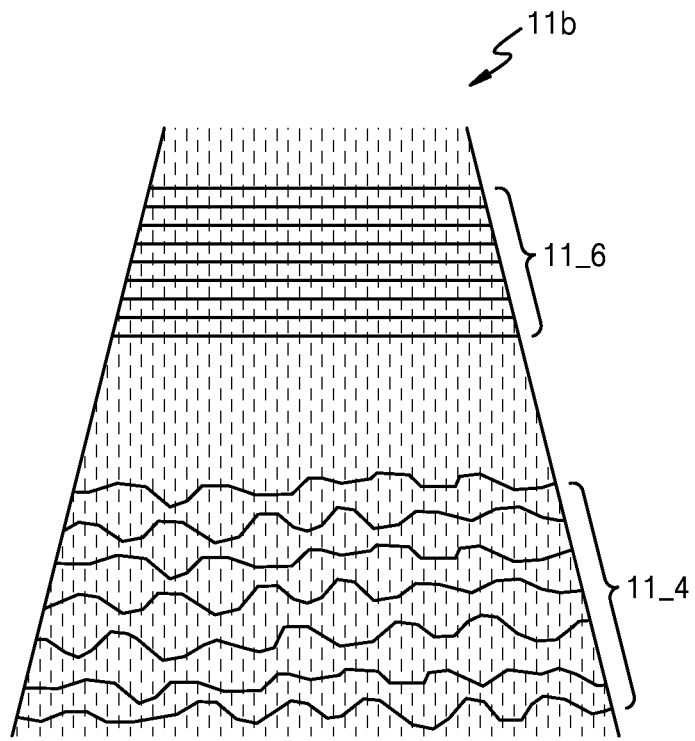

FIGS. 11A and 11B illustrate examples of a road geometry that is estimated according to example embodiments. Specifically, FIGS. 11A and 11B schematically illustrate examples of the road geometry indicated by the 3D data generated due to operation S80c of FIG. 10. As described above with reference to FIG. 10, the estimated road geometry may be expressed as the 3D data. Hereinafter, FIGS. 11A and 11B will be described with reference to FIG. 1.

Referring to FIG. 11A, a road geometry 11a, which is estimated, may indicate a profile and a cross slope of a road. For example, as shown in FIG. 11A, the road geometry 11a may include a bump 11_2, and a left side of the road geometry 11a may have a higher shape than a right side thereof in a direction in which a vehicle travels.

Referring to FIG. 11B, a road geometry 11b, which is estimated, may indicate a state of the road or a state of pavement. For example, as shown in FIG. 11B, the road geometry 11b may include a region 11_4 indicating cobblestone pavement and a region 11_6 indicating even pavement.

Figure 12:
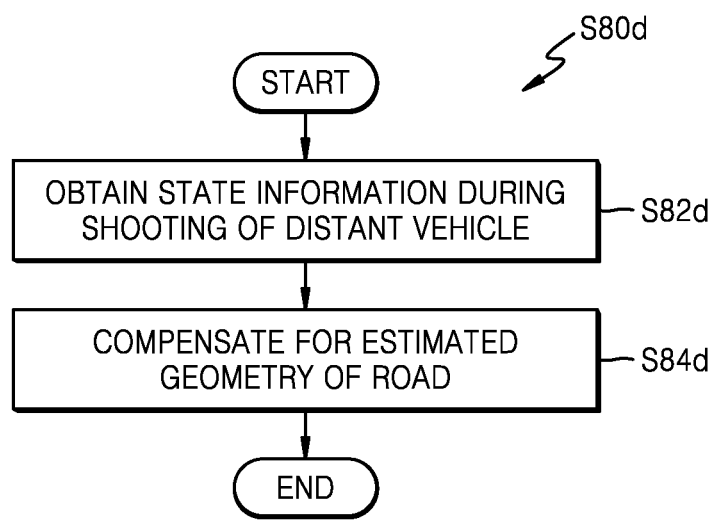
FIG. 12 is a flowchart of a method of estimating a road geometry, according to an example embodiment.

FIG. 12 is a flowchart of a method of estimating a road geometry, according to an example embodiment. Specifically, the flowchart of FIG. 12 illustrates an example of operation S80 of FIG. 2. As described above with reference to FIG. 2, an operation of estimating a geometry of a road may be performed in operation S80d of FIG. 12. As shown in FIG. 12, operation S80d may include operations S82d and S84d. Hereinafter, the flowchart of FIG. 12 will be described with reference to FIG. 1.

In operation S82d, an operation of obtaining state information during the shooting of a distant vehicle may be performed. For example, the processing device 110 may obtain a state of the vehicle 100 (i.e., a state of the camera module 120) during the shooting of the distant vehicle, based on a sense signal SEN provided by the at least one sensor 130. As in Cases A and B of FIG. 7A, a distant vehicle may be equally or similarly represented in image data IMG despite different geometries of roads. Thus, the processing device 110 may obtain state information during the shooting of the distant vehicle to compensate for geometric information about a road on which the vehicle 100 is located, in a geometry of the road on which the distant vehicle is located. For example, the at least one sensor 130 may include an acceleration sensor or a gyro sensor, which may sense a posture of the vehicle 100 (or the camera module 120), and the processing device 110 may obtain information about the state of the vehicle 100 during the shooting of the distant vehicle, based on the sense signal SEN.

In operation S84d, an operation of compensating for the estimated geometry of the road may be performed. In some embodiments, the processing device 110 may determine a profile of the point on which the vehicle 100 is located, based on the state information obtained in operation S82d, and compensate for a profile of the point, which has been estimated based on the image data IMG, based on the determined profile. For example, as in Case B of FIG. 7A, while both the vehicle 100 and the distant vehicle are traveling on an uphill road having substantially the same slope angle, the processing device 110 may determine a first slope angle of the uphill road on which the vehicle 100 is located, based on the sense signal SEN, and estimate a slope angle of the point on which the distant vehicle is located, by adding the first slope angle to a second slope angle (e.g., approximately zero (0) degrees) of the estimated road, based on the image data IMG.

In some embodiments, the processing device 110 may determine a cross slope of the point on which the vehicle 100 is located, based on the state information obtained in operation S83d, and compensate for a cross slope of the road, which is estimated based on the image data IMG, based on the determined cross slope. For example, the processing device 110 may determine a first cross slope of the point on which the vehicle 100 is located, based on the sense signal SEN, and estimate the cross slope of the point on which the distant vehicle is located, by adding the first cross slope to a second cross slope (e.g., the angle θ of FIG. 9) of the road, which is estimated based on the image data IMG.

Figure 13:
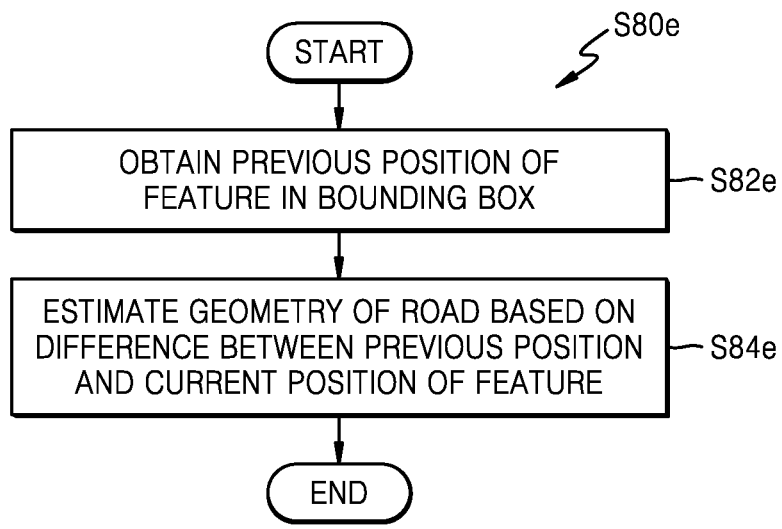
FIG. 13 is a flowchart of a method of estimating a road geometry, according to an example embodiment.

FIG. 13 is a flowchart of a method of estimating a road geometry, according to an example embodiment. Specifically, the flowchart of FIG. 13 illustrates an example of operation S80 of FIG. 2. As described above with reference to FIG. 2, an operation of estimating a geometry of a road may be performed in operation S80e of FIG. 13. As shown in FIG. 13, operation S80e may include operations S82e and S84e. Hereinafter, FIG. 13 will be described with reference to FIG. 1.

In operation S82e, an operation of obtaining a previous position of a feature in a bounding box may be performed. For example, the processing device 110 may store data about a bounding box detected in image data IMG and a feature extracted in the bounding box in the memory 113. To estimate the geometry of the road from image data IMG that is currently received, the processing device 110 may read data (e.g., the data about the bounding box and the feature), which is generated due to previously received image data IMG, from the memory 113. Thus, the processing device 110 may obtain a previous position of a feature relative to at least a portion of the bounding box.

In operation S84e, an operation of estimating the geometry of the road, based on a difference between the previous position and a current position of the feature, may be performed. In some embodiments, the processing device 110 may estimate the geometry based on a variation between the previous position and the current position of the feature. For example, when a longitudinal position of a license plate of a distant vehicle becomes higher than a previous position thereof, the processing device 110 may estimate a profile of a road having a lower slope angle than a profile of a previously estimated road. A decrement in slope angle may be determined based on a difference between the previous position and a current position of the license plate.

Figure 14:
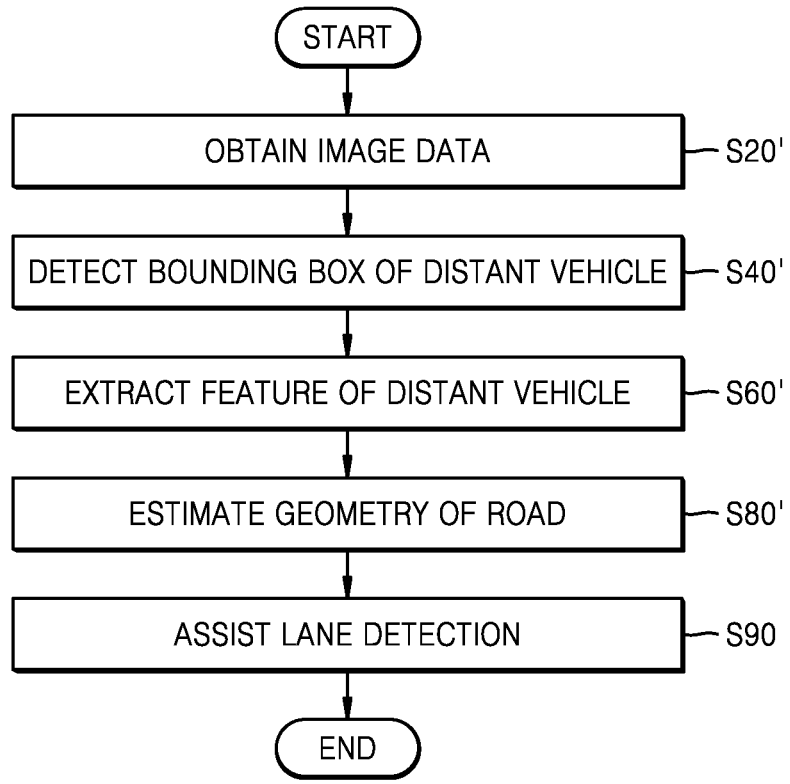
FIG. 14 is a flowchart of a method of estimating a road geometry, according to an example embodiment.

FIG. 14 is a flowchart of a method of estimating a road geometry, according to an example embodiment. Similarly to the method of FIG. 2, the method of FIG. 14 may include operations S20', S40', S60', and S80' and further include operation S90. Hereinafter, the same description as in FIG. 2 will be omitted from a description of FIG. 14, and the flowchart of FIG. 14 will be described with reference to FIG. 1.

In operation S20', an operation of obtaining image data IMG generated by shooting a distant vehicle may be performed. In operation S40', an operation of detecting a bounding box of the distant vehicle in the image data IMG may be performed. In operation S60', an operation of extracting a feature of the distant vehicle from the image data IMG may be performed. In operation S80', an operation of estimating a geometry of a road on which the distant vehicle is located, based on the bounding box and the feature, may be performed.

In operation S90, an operation of assisting lane detection may be performed. The lane detection may be utilized for various functions, such as autonomous driving, adaptive cruise control (ACC), lane departure warning (LDW), a lane keeping assistance system (LKAS), lane centering control (LCC), and the like. A shape of a lane shown in the image data IMG may vary depending on a geometry of a road in which the lane is located. Thus, the processing device 110 may assist the lane detection based on the geometry of the road, which is estimated in operation S80'. As a result, the accuracy of the lane detection may be improved.

Figure 15:
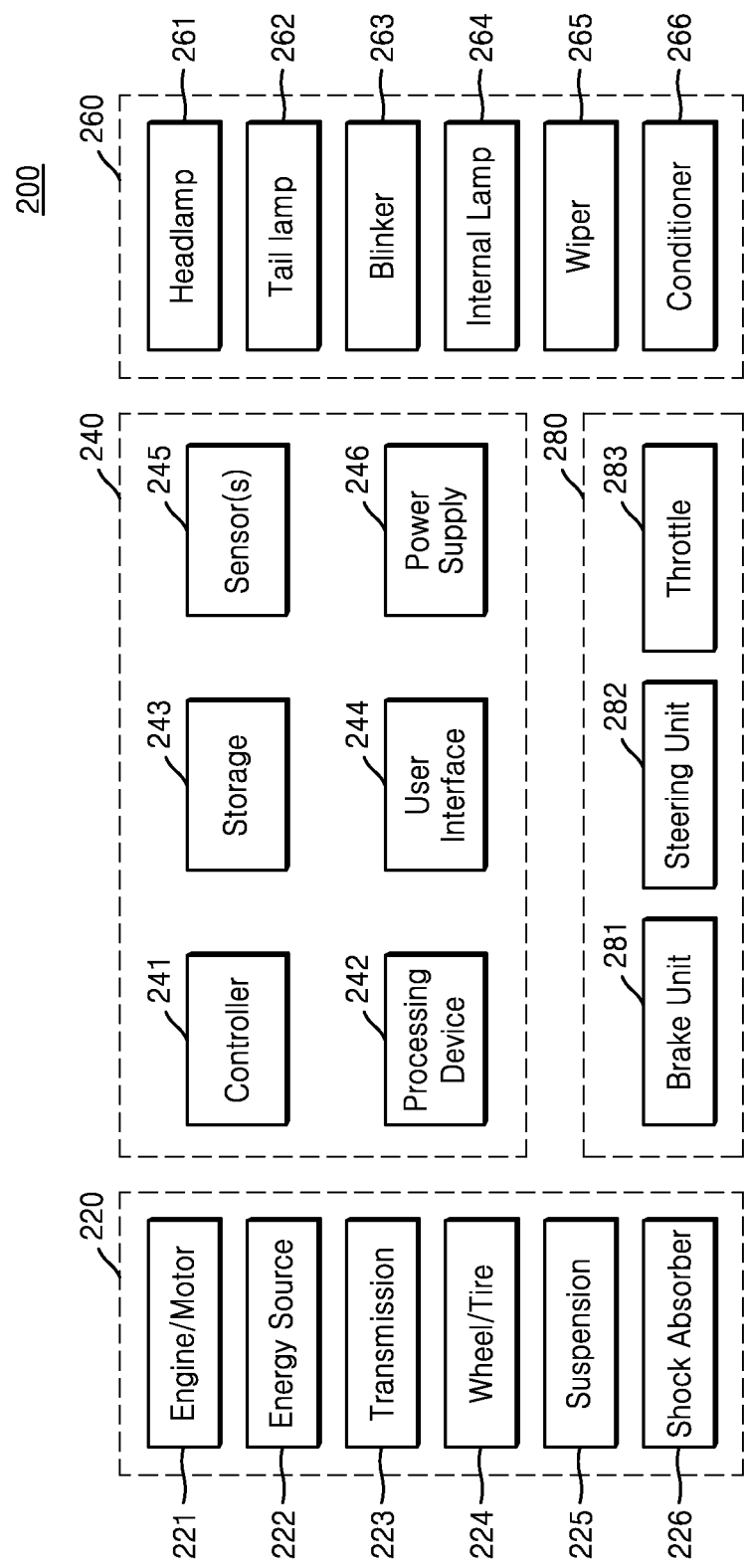
FIG. 15 is a block diagram of a vehicle according to an example embodiment.

FIG. 15 is a block diagram of a vehicle 200 according to an example embodiment. As shown in FIG. 15, the vehicle 200 may include a propulsion device 220, an electronic device 240, a peripheral device 260, and a driving device 280.

The propulsion device 220 may include an engine/motor 221, an energy source 222, a transmission 223, a wheel/tire 224, a suspension 225, and a shock absorber 226. The engine/motor 221 may include any combination of an internal combustion engine, an electric motor, a steam engine, and a Stirling engine. In some embodiments, when the vehicle 200 is a gas-electric hybrid car, the engine/motor 221 may include a gasoline engine and an electric motor. The energy source 222 may be an energy source that at least partially provides power to the engine/motor 221, and the engine/motor 221 may convert the energy source 222 into kinetic energy.

Non-limiting examples of the energy source 222 may include at least one of gasoline, diesel, propane, other compressed gas-based fuels, ethanol, a solar panel, a battery, and other electrical power sources. In some embodiments, the energy source 222 may include at least one of a fuel tank, a battery, a capacitor, and a flywheel. Also, the energy source 222 may provide energy not only to the engine/motor 221 but also to other components of the vehicle 200.

The transmission 223 may transmit mechanical power from the engine/motor 221 to the wheel/tire 224. For example, the transmission 223 may include at least one of a gearbox, a clutch, a differential, and a drive shaft. When the transmission 223 includes drive shafts, the drive shafts may include at least one wheel axle coupled to the wheel/tire 224. The wheel/tire 224 may have various structures for a bicycle, a motorcycle, a four-wheeled vehicle, and the like and be in contact with pavement.

The suspension 225, which is a device configured to support a weight of the vehicle 200, may adjust a ground clearance from pavement to the vehicle 200 or adjust vibration transmitted from the pavement to the vehicle 200. The shock absorber 226 may control the vibration of a spring, which is received from the pavement during the driving of the vehicle 200 and assist in restoring the spring to an original state. For example, the shock absorber 226 may generate damping force for stopping the vibration of the spring and control the elasticity of the spring. In some embodiments, the shock absorber 226 may be included in the suspension 225.

The electronic device 240 may include a controller 241, a processing device 242, a storage 243, a user interface 244, at least one sensor 245, and a power supply 246. The controller 241 may control the vehicle 200 and be also referred to as an electronic control unit (ECU). For example, the controller 241 may control the propulsion device 220 and the driving device 280 to control the driving of the vehicle 200 and may control the peripheral device 260. In some embodiments, as described below with reference to FIG. 16, the controller 241 may control the vehicle 200 based on a road geometry provided by the processing device 242.

The processing device 242 may perform various operations for assisting the driving of the vehicle 200. For example, as described above with reference to the drawings, the processing device 242 may receive image data from an image sensor included in the at least one sensor 245 and estimate a road geometry based on the image data. Also, the processing device 242 may store data indicating the estimated road geometry in the storage 243 or provide the data to the controller 241. In some embodiments, as described above with reference to FIG. 1, the processing device 242 may include a first processor and a second processor.

The storage 243 may store data and include, for example, a non-volatile semiconductor memory device, a volatile semiconductor memory device, and/or a disk drive. The user interface 244 may include an input device configured to receive a user input and an output device configured to provide an output signal to a user. For example, the input device may include a keypad, a dome switch, a touch pad, a jog wheel, a jog switch, and/or a microphone. Also, the output device may include a speaker and/or a buzzer configured to output an audio signal and a display device and/or a light-emitting diode (LED) configured to output a video signal.

The at least one sensor 245 may include a sensor configured to sense a state of the vehicle 200. For example, the at least one sensor 245 may include a motion sensor, such as a geomagnetic sensor, an acceleration sensor, and a gyro sensor, or include a GPS sensor configured to estimate a position of the vehicle 200. Also, the at least one sensor 245 may include a sensor configured to sense a surrounding state of the vehicle 200. For example, the at least one sensor 245 may include a RADAR sensor configured to sense presence and/or speeds of objects around the vehicle 200 using a radio signal or include a LIDAR sensor configured to sense presence and/or speeds of objects around the vehicle 200 using laser. Furthermore, the at least one sensor 245 may include at least one image sensor (or a camera module including an image sensor) configured to shoot the vicinity of the vehicle 200. The image sensor may provide image data, which is generated by shooting a distant vehicle, to the processing device 242.

The power supply 246 may provide power to at least some of components of the vehicle 200. For example, the power supply 246 may include a generator configured to generate power due to the driving of the vehicle 200 or a battery configured to store electric power.

The peripheral device 260 may include a headlamp 261, a tail lamp 262, a blinker 263, an internal lamp 264, a wiper 265, and a conditioner 266. The headlamp 261 may be arranged on a front surface of the vehicle 200, and the tail lamp 262 may be arranged on a rear surface of the vehicle 200. As described above with reference to FIGS. 5A to 5C, the headlamp 261 and/or the tail lamp 262 may be extracted as features by another vehicle. The blinker 263 may be arranged on the front surface, the rear surface, and a side surface of the vehicle 200, and the internal lamp 264 may be arranged in a driver's space. The wiper 265 may reciprocate on glass arranged on the front surface and/or the rear surface of the vehicle 200. The conditioner 266 may include an air conditioner and/or a heater.

The driving device 280 may include a brake unit 281, a steering unit 282, and a throttle 283. The brake unit 281 may be implemented as a combination of mechanisms configured to decelerate the vehicle 200. For example, the brake unit 281 may use friction to reduce a rotational speed of the wheel/tire 224. The steering unit 282 may be implemented as a combination of mechanisms configured to adjust a direction in which the vehicle 200 travels. The throttle 283 may be implemented as a combination of mechanisms configured to control an operation speed of the engine/motor 221. For example, the throttle 283 may adjust the amount of a gas mixture of fuel air flowing into the engine/motor 221 and control power and thrust.

Figure 16:
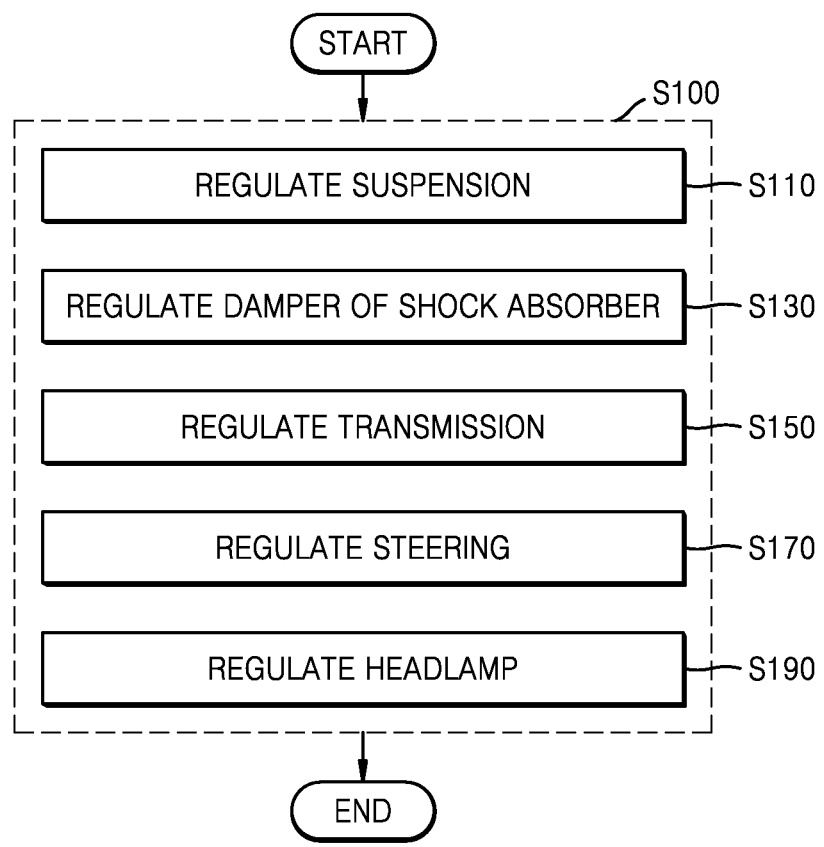
FIG. 16 is a flowchart of a method of estimating a road geometry, according to an example embodiment.

FIG. 16 is a flowchart of a method of estimating a road geometry, according to an example embodiment. Specifically, the flowchart of FIG. 16 illustrates a method S100 of controlling a vehicle based on the estimated road geometry. As shown in FIG. 16, the method S100 of controlling the vehicle may include a plurality of operations S110, S130, S150, S170, and S190. In some embodiments, the method S100 of controlling the vehicle may include only some of the plurality of operations S110, S130, S150, S170, and S190. In some embodiments, the method S100 of controlling the vehicle may be performed by the controller 241 of FIG. 15. Hereinafter, FIG. 16 will be described with reference to FIG. 15.

In operation S110, an operation of regulating the suspension 225 may be performed. In operation S130, an operation of regulating a damper of the shock absorber 226 may be performed. For example, when an ascending profile is estimated by the processing device 242, the controller 241 may regulate the suspension 225 and the shock absorber 226 to reduce vibration transmitted from pavement to the vehicle 200. Also, when a bump is estimated, the controller 241 may regulate the suspension 225 so that a ground clearance of the vehicle 200 may be elevated.

In operation S150, an operation of regulating the transmission 223 may be performed. For example, when an ascending profile is estimated by the processing device 242, the controller 241 may regulate the transmission 223 to increase a transmission gear ratio. In operation S170, a steering regulation operation may be performed. For example, when a curved road having a cross slope is estimated by the processing device 242, the controller 241 may regulate the steering unit 282 along the curved road. In operation S190, an operation of regulating the headlamp 261 may be performed. For example, when a descending profile is estimated by the processing device 242, the controller 241 may regulate the headlamp 261 so that light emitted by the headlamp 261 may be directed downward.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A method comprising:
   obtaining an input image, the input image being generated by imaging a distant vehicle;
   detecting a bounding box of the distant vehicle from the input image;
   extracting at least one feature of the distant vehicle from the input image; and
   estimating a geometry of a road on which the distant vehicle is located, based on a position of the at least one feature relative to at least a portion of the bounding box.

2. The method of claim 1, wherein the detecting of the bounding box comprises:
providing the input image to a machine learning model learned by a plurality of vehicle images; and
obtaining the bounding box from the machine learning model.

3. The method of claim 1, wherein the extracting of the at least one feature comprises extracting at least one of a headlamp, a tail lamp, a license plate, a side mirror, and a wheel of the distant vehicle.

4. The method of claim 1, wherein the estimating of the geometry of the road comprises:
measuring a longitudinal position of the at least one feature in the bounding box; and
estimating a profile of the road, based on the measured longitudinal position.

5. The method of claim 1, wherein the estimating of the geometry of the road comprises:
detecting an inclination of the at least one feature; and
estimating a cross slope of the road, based on the detected inclination.

6. The method of claim 1, further comprising:
obtaining a distance from the distant vehicle; and
generating three-dimensional (3D) data, based on the distance and the geometry of the road.

7. The method of claim 6, wherein the obtaining of the distance comprises obtaining the distance which is measured by at least one sensor.

8. The method of claim 6, wherein the obtaining of the distance comprises estimating the distance based on at least one of a position and a size of the bounding box in the input image.

9. The method of claim 1, wherein the estimating of the geometry of the road comprises:
obtaining state information during the imaging of the distant vehicle; and
compensating for the geometry of the road, based on the state information.

10. The method of claim 1, wherein the estimating of the geometry of the road comprises:
obtaining a previous position of the at least one feature relative to at least the portion of the bounding box; and
estimating the geometry of the road, based on a difference between the previous position and a current position of the at least one feature.

11. A processing device comprising:
a first processor configured to detect a bounding box of a distant vehicle, in an input image generated by imaging the distant vehicle, and extract at least one feature of the distant vehicle; and
a second processor configured to estimate a geometry of a road on which the distant vehicle is located, based on a position of at least one feature relative to at least a portion of the bounding box.

12. The processing device of claim 11, further comprising:
a memory configured to store information about the position of the at least one feature relative to at least the portion of the bounding box, wherein
the second processor is configured to estimate the geometry of the road, based on a difference between the information stored in the memory and a current position of the at least one feature relative to at least the portion of the bounding box.

13. The processing device of claim 11, wherein the second processor is configured to assist lane detection, based on the geometry of the road.

14. A vehicle comprising:
a camera module configured to image a distant vehicle and generate an input image;
a processing device configured to detect a bounding box and at least one feature of the distant vehicle in the input image and estimate a geometry of a road on which the distant vehicle is located, based on a position of the at least one feature relative to at least a portion of the bounding box; and
a controller configured to generate a control signal for controlling the vehicle, based on the geometry of the road.

15. The vehicle of claim 14, wherein the processing device is configured to estimate a profile of the road, based on a longitudinal position of the at least one feature in the bounding box.

16. The vehicle of claim 14, wherein the processing device is configured to estimate a cross slope of the road, based on an inclination of the at least one feature.

17. The vehicle of claim 14, wherein:
the processing device is configured to generate three-dimensional (3D) data, based on a distance from the distant vehicle and the geometry of the road, and
the controller is configured to generate the control signal, based on the 3D data and a distance by which the vehicle travels.

18. The vehicle of claim 14, further comprising:
at least one of an acceleration sensor and a gyro sensor, which are configured to sense a posture of the vehicle, wherein
the processing device is configured to compensate for the geometry of the road, based on the posture of the vehicle.

19. The vehicle of claim 14, wherein the processing device is configured to estimate the geometry of the road, based on a difference between a previous position and a current position of the at least one feature relative to at least the portion of the bounding box.

20. The vehicle of claim 14, wherein the controller generates the control signal to regulate at least one of a suspension, a damper of a shock absorber, speed, a transmission, steering, and a headlamp.

* * * * *